US007277219B2

(12) United States Patent
Ikeda

(10) Patent No.: US 7,277,219 B2
(45) Date of Patent: Oct. 2, 2007

(54) PARTICLE MOVEMENT-TYPE DISPLAY DEVICE AND PARTICLE MOVEMENT-TYPE DISPLAY APPARATUS

(75) Inventor: Tsutomu Ikeda, Hachiohji (JP)

(73) Assignee: Canon Kabushiki Kaisha, Tokyo (JP)

( * ) Notice: Subject to any disclaimer, the term of this patent is extended or adjusted under 35 U.S.C. 154(b) by 60 days.

(21) Appl. No.: 11/275,031

(22) Filed: Dec. 5, 2005

(65) Prior Publication Data

US 2006/0119568 A1 Jun. 8, 2006

(30) Foreign Application Priority Data

Dec. 7, 2004 (JP) ............................ 2004-354330

(51) Int. Cl.
*G02B 26/00* (2006.01)
*G02G 3/34* (2006.01)

(52) U.S. Cl. ...................................... 359/296; 345/107

(58) Field of Classification Search ................ 359/296; 345/107

See application file for complete search history.

(56) References Cited

U.S. PATENT DOCUMENTS 6,072,621 A 6/2000 Kishi et al. ................. 359/296
6,221,267 B1 4/2001 Ikeda et al. ................... 216/24
6,525,865 B2 2/2003 Katase ........................ 359/296
6,741,385 B2 5/2004 Ikeda et al. ................. 359/296
6,876,476 B1 4/2005 Miura et al. ................ 359/252
6,897,996 B2 5/2005 Ikeda et al. ................. 359/296
6,919,003 B2 7/2005 Ikeda et al. ................. 204/490
6,958,842 B2 10/2005 Miura et al. ................ 359/252
2003/0095094 A1* 5/2003 Goden ........................ 345/107
2005/0174321 A1 8/2005 Ikeda et al. ................. 345/107
2006/0125776 A1 6/2006 Togano et al. .............. 345/107

* cited by examiner

*Primary Examiner*—Evelyn A. Lester
(74) *Attorney, Agent, or Firm*—Fitzpatrick, Cella, Harper & Scinto

(57) ABSTRACT

A particle movement type display device includes a plurality of pixels each of which is constituted by a first substrate and a second substrate disposed opposite to each other with a spacing therebetween, charged particles disposed between the first substrate and the second substrate, a first electrode and a second electrode disposed in contact with the spacing. An image is displayed by moving the charged particles under application of an electric field between the first electrode and the second electrode. The first electrode is formed on the first substrate at a part of a portion corresponding to each pixel, and a non-electrode forming portion at which the first electrode is not formed is provided on the first substrate.

8 Claims, 4 Drawing Sheets

(a)

(b)

PARTICLE MOVEMENT-TYPE DISPLAY DEVICE AND PARTICLE MOVEMENT-TYPE DISPLAY APPARATUS

FIELD OF THE INVENTION AND RELATED ART

The present invention relates to a particle movement-type display device and a particle movement-type display apparatus, particularly a constitution of an electrode formed on a front-side (display-side) substrate.

In recent years, study on reflection-type display apparatuses using no backlight has been actively made. Of these reflection-type display apparatuses, a particle movement-type display apparatus for effecting display by moving particles under application of voltage has received considerable attention.

As an example of the particle movement-type display apparatus, an electrophoretic display apparatus is used. The electrophoretic display apparatus includes an electrophoretic display device constituted by a pair of substrates disposed opposite to each other with a predetermined spacing therebetween, charged particles (electrophoretic particles) disposed between the substrates, and a pair of electrodes disposed to face the spacing. This electrophoretic display device has various advantages, compared with a liquid crystal display device, that it has a high display contrast, a wide viewing angle, and a display memory characteristic and that it does not require a backlight and a polarizer.

An image display method (mode) of such a conventional electrophoretic display device is classified into a vertical movement method (mode) wherein charged particles disposed between a front-side (display-side) substrate (which is a substrate on a side where a user observes the device) and a rear-side substrate (which is a substrate on an opposite side away from the side where the user observes the device) are moved in a vertical direction with respect to the substrate surfaces to display an image, and a horizontal movement method (mode) wherein the charged particles are moved in a horizontal direction with respect to the substrate surfaces to display an image. Further, in the vertical movement method, a pair of electrodes for generating an electric field for moving the charged particles are disposed separately on surfaces of the front (display)-side substrate and the rear-side substrate. On the other hand, in the horizontal movement method, the two electrodes are disposed on the surface of the rear-side substrate or separately disposed on the surface of the rear-side substrate and the surface of partition wall.

In the horizontal movement method, with respect to movement of the charged particles, it is not necessary to dispose the electrode on the surface of the front-side substrate in nature. However, there is a possibility that a display state is adversely affected when a strange electric charge is externally exerted on the surface of the front-side substrate, so that an electrode may preferably be disposed also on the surface of the front-side substrate in some cases in order to prevent the above-described phenomenon.

However, in the case where the electrode is also disposed on the surface of the front-side substrate as described above, transmitted light is attenuated to darken a display state. In order to solve the problem, U.S. Pat. No. 6,525,865 has proposed an electrophoretic display device in which an electrode is disposed at a portion, on a front side substrate, corresponding to a part of a partition wall, disposed between a pair of substrates, for holding a spacing between the pair of substrates and partitioning the spacing into a plurality of pixels, thus permitting bright display.

However, in the electrophoretic display device provided with the electrode at the portion, on the front-side substrate, corresponding to the partition wall, it becomes possible to effect bright display. However, in the case where black charged particles are attracted to the electrode on the front-side substrate, a larger amount of the charged particles are attracted to the partition wall side, so that a concentration of the black charged particles is smaller with an increasing distance from the partition wall. As a result, uniform black display cannot be effected.

SUMMARY OF THE INVENTION

The present invention has been accomplished in view of these circumstances.

An object of the present invention is to provide an electrophoretic display device, as an example of a particle movement type display device, capable of effecting bright and uniform display.

Another object of the present invention is to provide a particle movement-type display apparatus including the particle movement type display device.

According to an aspect of the present invention, there is provided a particle movement-type display device, comprising:

a pair of front-side first substrate and rear-side second substrate disposed opposite to each other with a spacing therebetween;

a partition wall, disposed between the first and second substrates, for partitioning the spacing into a plurality of sections;

charged particles disposed in each of the sections;

a first electrode disposed on a surface of the first substrate in each section; and a second electrode and a third electrode which are disposed on surfaces, other than the surface of the first substrate, in each section; between the second electrode and the third electrode, a voltage being applied so as to move the charged particles in each section to display an image;

wherein the surface of the first substrate in each section has a first area in which the first electrode is formed and a second area in which the first electrode is not formed.

In the particle movement type display device, the first electrode is formed at a part of a portion, corresponding to the pixel, on the first substrate on an observer side and a non-electrode forming portion where the first electrode is not formed is provided at another part of the portion on the first substrate. As a result, it becomes possible to effect bright and uniform display.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

Hereinbelow, preferred embodiments of the particle movement type display device according to the present invention will be described with reference to the drawings.

Figure 1:
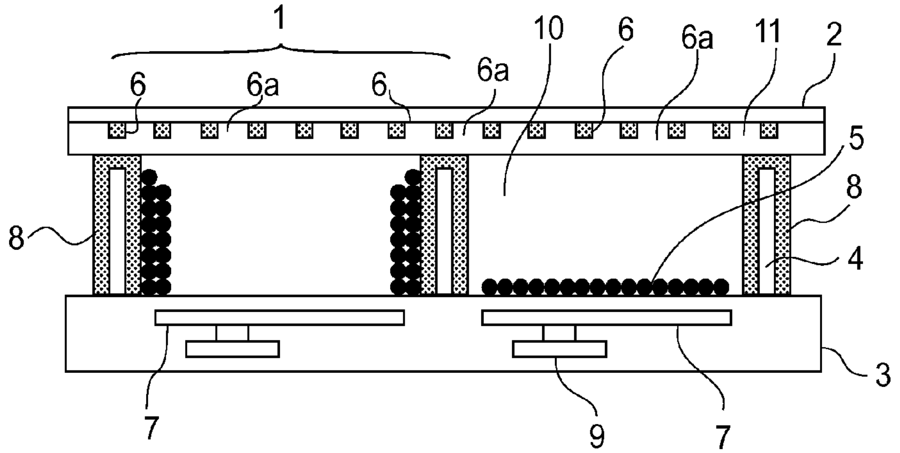
FIG. 1 is a schematic sectional view showing a structure of an electrophoretic display device as an example of the particle movement type display device according to the present invention.

FIG. 1 is a schematic view showing a sectional surface of an electrophoretic display device as an example of the particle movement type display device of the present invention.

Referring to FIG. 1, the electrophoretic display device includes a plurality of pixels 1 each constituted by a first substrate (a front (display)-substrate) 2 disposed on an observer side, a second substrate (a rear-side substrate) 3 disposed opposite to the first substrate 2 with a predetermined spacing therebetween, and a partition wall 4 disposed between the first substrate 2 and the second substrate 3.

In each pixel 1, an insulating liquid 10 and a plurality of charged particles (electrophoretic particles) 5 disposed in the insulating liquid 10 are further disposed.

On the first substrate 2, a first electrode 6 for applying an electric field to the charged particles 5 is disposed. Further, a second electrode 7 for applying an electric field to the charged particles 5 is disposed on the second substrate 3, and a third electrode 8 is disposed at a surface of the partition wall 4. The third electrode 8 may also be disposed only at an upper surface or lower surface of the partition wall 4 or portions of the surface of the first substrate or the surface of the second substrate which are close to the partition wall 4.

Here, the second electrode 7 is electrically connected with a switching element 9, such as a thin film transistor (TFT), formed on the second substrate 3 and constitutes a pixel electrode, and also has a function as a reflection layer for reflecting incident light. The second electrode 7 also having the reflection layer function may preferably be provided with a scattering layer on its observer side or provided with a surface unevenness so as to cause irregular reflection. Further, the first electrode 6 and the third electrode 8 are common electrodes of the plurality of pixels. Incidentally, a resinous layer 11 as an insulating layer is disposed on the first substrate 2 so as to cover the first electrode 6.

In the thus constituted electrophoretic display device, display is effected by applying a voltage among the first electrodes 5 principally between the second electrode 7 and the third electrode 8.

For example, as shown at a left-side pixel 1 in FIG. 1, the charged particles 5 are collected on the third electrode 8 by applying an electric field, so that it is possible to not only reflect the incident light at the surface of the second electrode 7 but also scatter the incident light by the scattering layer. Further, as shown at a right-side pixel in FIG. 1, it is possible to display the color of the charged particles by collecting the charged particles 5 on the second electrode 7. Accordingly, it becomes possible to effect white/black display when the color of the charged particles 5 is black.

Incidentally, in order to effect color display, the charged particles 5 or other members may appropriately be colored. For example, it becomes possible to realize color display by using back charged particles 5 in combination with a color filter disposed on the surface of the second electrode 7.

The first electrode 6 is used for preventing adverse affect on display in the case where a strong electrostatic force is externally applied. Further, in the case where the third electrode 8 is not provided at the surface of the partition wall 4 as described later with reference to FIG. 5(*b*), the first electrode 6 is used for generating an electric field for moving the charged particles 5 in combination with the second electrode 7.

Figure 2:
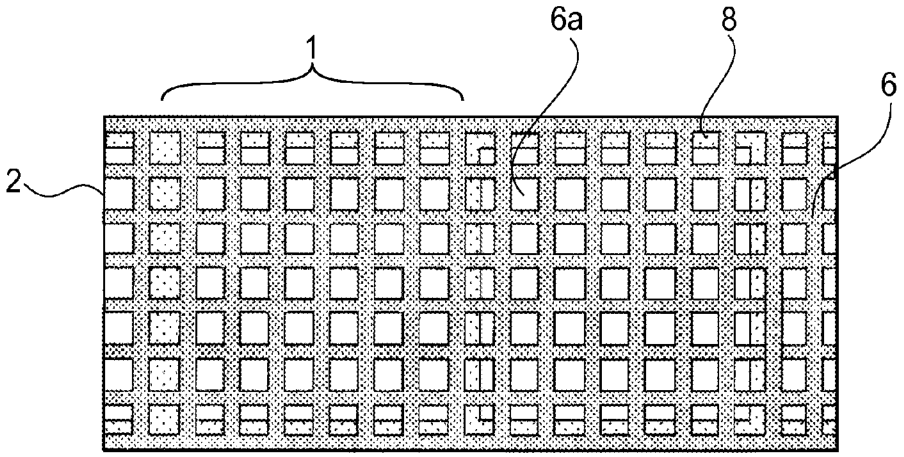
FIG. 2 is a schematic plan view for illustrating a shape of a first electrode formed on a first substrate of the electrophoretic display device.

FIG. 2 is a plan view of the electrophoretic display device shown in FIG. 1 viewed from a direction of the first substrate side (i.e., the front (display) substrate side). The first electrode 6 disposed on the surface of the first substrate 2 has a rectangular lattice-like shape and is also disposed on the partition wall 8 having a similar rectangular lattice-like shape. A non-electrode forming portion 6*a* include a plurality of square portions arranged with an identical pitch in vertical and horizontal directions.

In FIG. 2, the first electrode 6 is depicted as an opaque portion so that the pixel 1 and the partition wall 8 can be observed only through the non-electrode forming portion 6*a*. However, in an actual display device, the first electrode 6 is formed of a transparent material such as indium-tin-oxide (ITO), so that light substantially passes through the first electrode 6. However, strictly speaking, the ITO electrode is not completely transparent, so that about 10% of light is absorbed by the ITO electrode when the ITO electrode has a thickness of several hundred nanometers. As a result, when the entire surface of the first substrate 2 is covered with the first electrode 6, a resultant light transmittance is lowered to the extent that it is not negligible. However, as in the present invention, only a part of the pixel is covered with the first electrode 6, so that it is possible to restore the brightness of the pixel.

The pitch of the lattice-like first electrode 6 is smaller than a pitch of the pixel 1. In the embodiment shown in FIG. 2, when the pixel pitch is taken as 1, the lattice pitch is 0.15. As a result, an aperture ratio of the lattice, i.e., an areal ratio of the non-electrode forming portion 6*a* to the entire area (the first electrode 6 and the non-electrode forming portion 6*a*) is 44%.

According to this embodiment, the first electrode 6 is formed in such a rectangular lattice-like shape that the lattice pitch is considerably smaller than the pixel pitch, so that interference with the partition wall can be reduced to a low level and thus moire is less liable to occur. The aperture ratio can be designed arbitrarily but the non-electrode forming portion 6*a* is formed in a large area, so that it becomes possible to improve a light transmittance of the entire pixel when compared with the case of forming the first electrode over the entire surface of the first substrate 2. Further, when compared with the case where the first electrode 6 is formed on the first substrate 2 only at a portion corresponding to the partition wall 4, it is possible to prevent concentration of the charged particles 5 at the partition wall portion.

Figure 3:
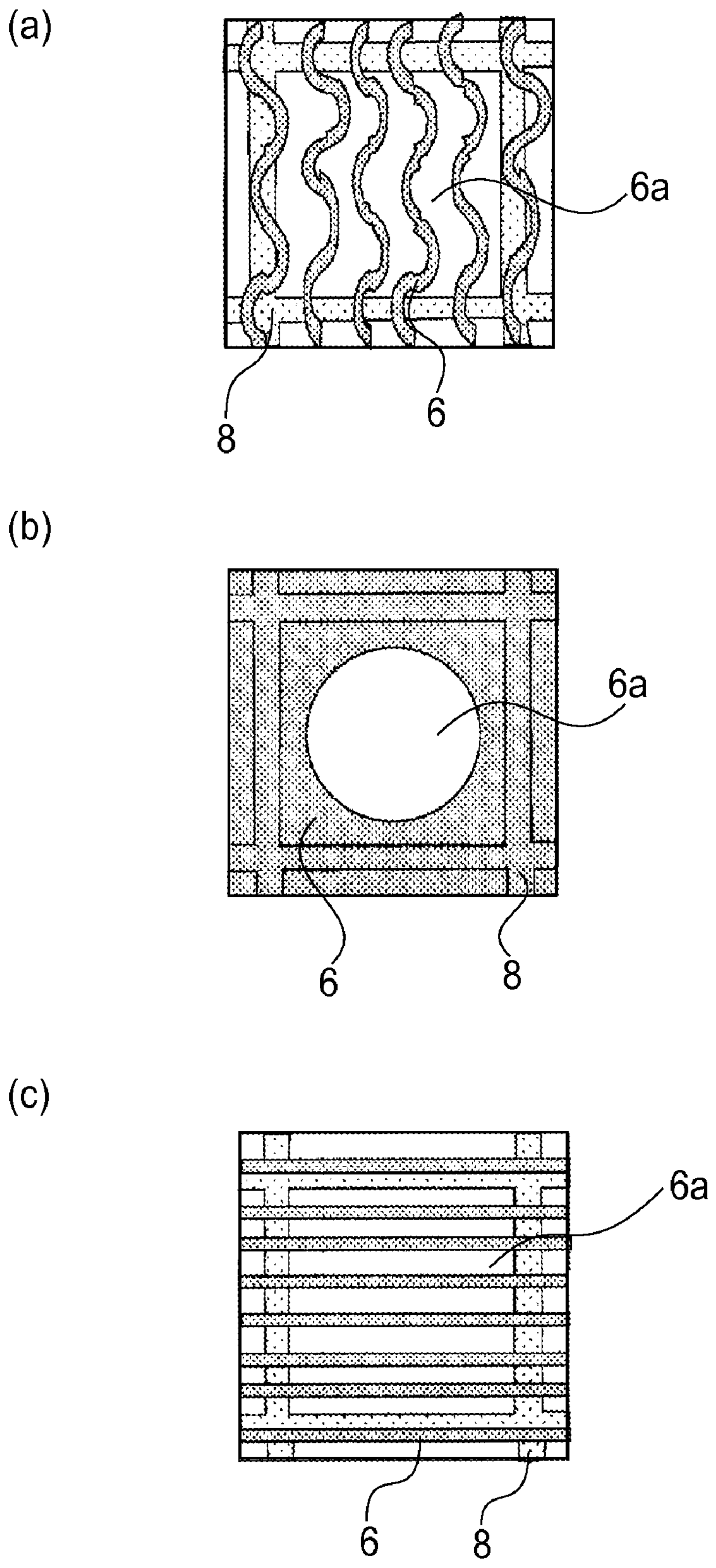
FIG. 3(*a*) to 3(*c*) and FIGS. 4(*a*) to 4(*c*) are schematic plan views for illustrating other shapes of the first substrate formed on the first substrate of the electrophoretic display device.
Figure 4:
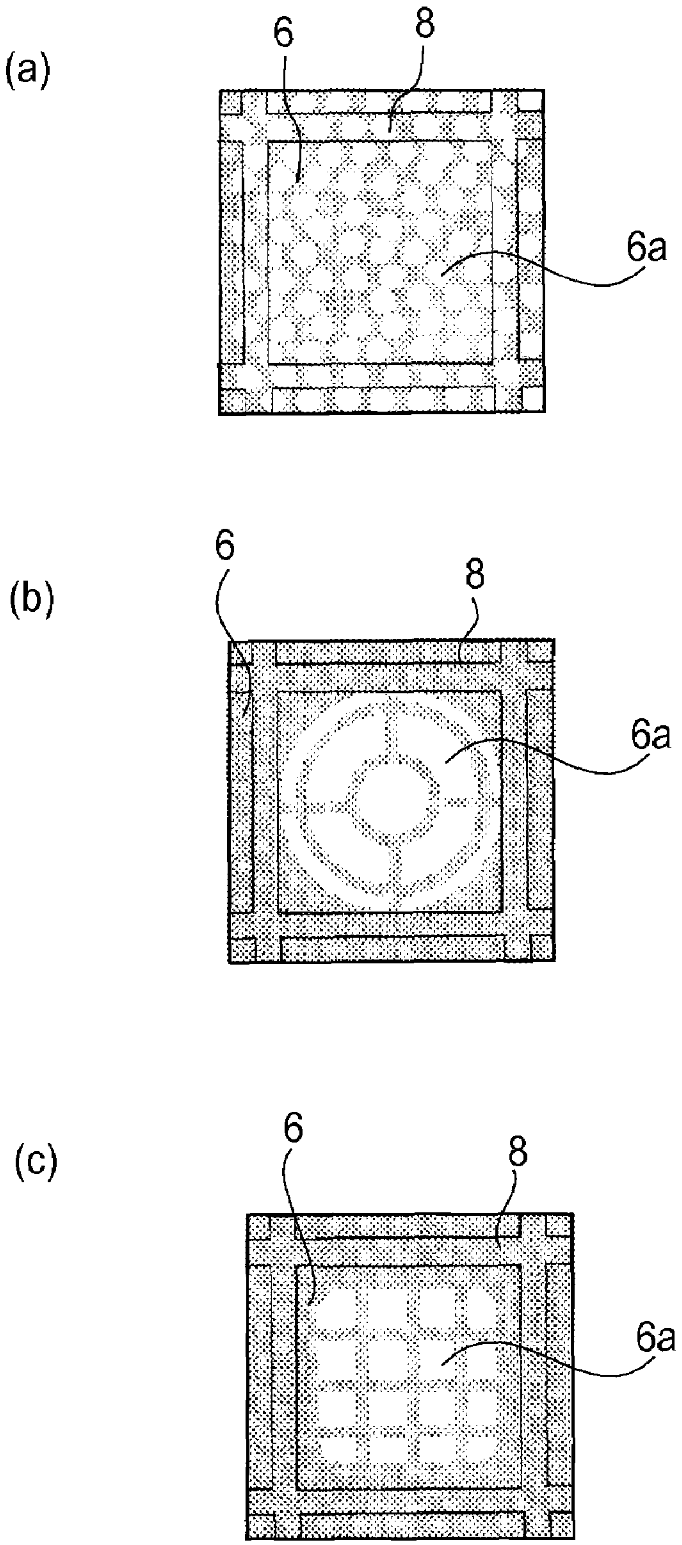

The shape of the first electrode 6 may include those shown in FIGS. 3(*a*) to 3(*c*) and FIGS. 4(*a*) to 4(*c*), in addition to that shown in FIG. 2. In order to reduce an irregularity in brightness among the pixels, the lattice pitch may be made sufficiently smaller than the pixel pitch as shown in FIGS. 2, 3(*a*), 3(*c*), and 4(*a*). Alternatively, the areal ratio of the first electrode for each pixel may be equal to each other as shown in FIGS. 3(*b*), 4(*b*) and 4(*c*). Particularly, as shown in FIGS. 3(*b*) and 4(*b*), the brightness is further improved in the case where the non-electrode forming portion 6_a_ is formed predominantly at a central portion compared with a pixel peripheral portion.

This is because incident light and reflected light are liable to move toward the partition wall at a pixel peripheral portion, so that a part of the lights is absorbed by the partition wall 4. On the other hand, at a pixel central portion, it is possible to suppress the absorption of the incident light and the reflected light to a low level. Incidentally, the pixel shape is square as shown in FIGS. 2-4 but is not particular limited. It is also possible to use other shapes, for the pixel, such as a circular shape, a rectangular shape, other polygonal shapes, etc.

Further, it is possible to variously charge an electric field generating function, of the first electrode 6, for driving the charged particles 5 by an area and arrangement of the first electrode 6. As a result, it is possible to appropriately select the shape of the first electrode 6. For example, when a ratio of the electrode forming area to the pixel area within the pixel is less than 100%, a light transmittance improving effect is achieved. However, when the areal ratio comes close to 100%, the light transmittance improving effect is reduced. On the other hand, when the areal ratio comes close to 0%, i.e., when the ratio of the electrode forming area is large, protection of the pixel from static electricity becomes insufficient. For this reason, the pixel is liable to be adversely affected by external static electricity or the like.

Accordingly, the ratio of the electrode forming area to the pixel area within the pixel may preferably be in the range of 5-90%, more preferably 20-80%. Here, the pixel means a portion inside the partition wall, when viewed from the observer side. For example, in the case where the first electrode 6 has a line (stripe) shape as shown in FIG. 3(_a_), it is effective to adopt such a method that the first electrode 6 having an electrode width smaller than that of the non-electrode forming portion 6_a_ is formed with a narrow pitch.

As described above, on the first substrate 2 on the observer side, the first electrode 6 is formed at a part of a portion of first substrate 2 corresponding to the pixel, so that the first electrode 6 and the non-electrode forming portion 6_a_ at which the first electrode 6 is not formed are provided on the first substrate 2, thus enabling uniform display.

Incidentally, in this embodiment, the first substrate 2 and the second substrate 3 may be formed of plastic films of polyethylene terephthalate (PET), polycarbonate (PC), polyether sulfone (PES), etc.; glass; quartz; and the like. Further, in the case of the reflection-type electrophoretic display device, it is necessary to use transparent materials for the first substrate 2 and a support therefor to be disposed on the observer side but as the other second substrate 3, it is possible to use a colored material or an opaque material, such as a polyimide (PI) film, stainless steel substrate, etc.

Further, the shape of the first electrode 6 formed on the first substrate 2 may be, in addition to the lattice-like shape as shown in FIG. 2, a line-like shape, a circular shape, or indefinite shapes as shown in FIGS. 3(_a_) to 3(_c_) and FIGS. 4(_a_) to 4(_c_). Further, as a material for the first electrode 6, it is possible to use an ordinarily used transparent electroconductive film of indium tin oxide (ITO). In addition to an inorganic film of ITO, etc., it is also possible to use an organic film to which electroconductivity is imparted.

Further, the second electrode 7 may be formed of a material, having a high light-reflectivity, such as Al, Ag, alloys thereof, etc., in the case where the second electrode 7 also has a function as a reflection layer. Incidentally, as a method of scattering incident light, it is possible to use a method wherein a resin layer in which fine particles having a refractive index different from the resin are dispersed is formed on the second electrode 7, and a method wherein the second electrode 7 is provided with an unevenness to cause scattering as described above.

Further, the second electrode 8 is formed between adjacent pixels, so that it may preferably be colored black. Incidentally, in this case, an electrode material itself may be colored or a blackened layer is formed on the surface of the electrode material. The partition wall 4 may be formed of an organic material or an inorganic material, and such a material itself may be provided with electroconductively.

The charged particles 5 may be formed of particles of various inorganic pigments or organic pigments, carbon black, or resins containing these pigments. The charged particles 5 may generally have a particle size of 0.01-10 μm, preferably 0.1-5 μm.

In the case of effecting display by utilizing electrophoresis, the insulating liquid 10 containing the charged particles 5 dispersed therein is disposed in the pixel and may suitably comprise a nonpolar solvent such as isoparaffin, silicone oil, xylene, toluene, etc.

In the above described insulating liquid 10 or charged particles 5, it is possible to add a charge control agent for controlling and stabilizing chargeability of the charged particles 5 or a dispersing agent for preventing agglomeration of the charged particles and maintaining a dispersion state.

Further, the resinous layer 11 covering the first electrode 6 and the non-electrode forming portion 6_a_ on the surface of the first substrate 2 may preferably be formed of a resin having a volume resistivity of not more than $1.0\times10^{11}$ ohm.cm and a high light-transmittance. Further, by coating the first electrode 6 surface and the non-electrode forming portion 6_a_ with such a resin having a low volume resistivity, the area of the non-electrode forming portion 6_a_ can be increased when compared with the case of performing the coating with a resin having a higher volume resistivity. As a result, it becomes possible to increase the light transmittance.

Figure 5:
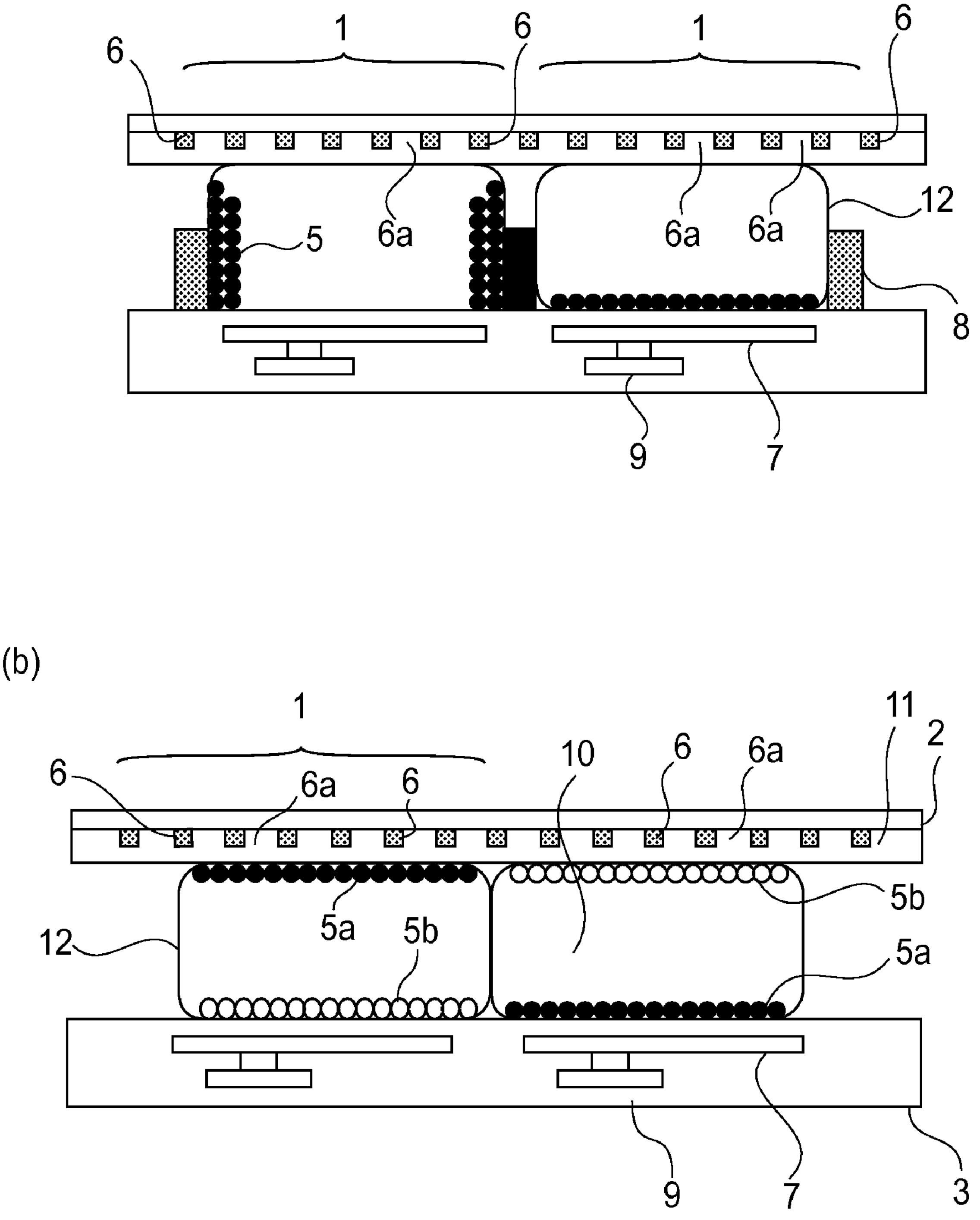
FIGS. 5(*a*) and 5(*b*) are schematic sectional views showing other structural examples of the electrophoretic display device.

Further, it is also possible to dispose the insulating liquid 10 and the charged particles 5 in the form of a microcapsule at each pixel 1 as shown in FIG. 5(_a_). In this case, one or more of a microcapsule 12 in which the insulating liquid 10 and the charged particles 5 are incorporated is disposed between the first and second substrates 2 and 3.

Incidentally, in this embodiment, the case of driving the charged particles 5 by using the first to third electrodes 6 to 8 is described but it is also possible to drive the charged particles 5 only by the first electrode 6 and the second electrode 7 without forming the third electrode 8 as shown in FIG. 5(_b_). In this case, the charged particles 5 are moved in the vertical direction with respect to the substrate surface by application of an electric field, so that display is effected by using particles 5_a_ and 5_b_ having different colors and different charge polarities as the charged particles 5 or by coloring the insulating liquid 10 in which the charged particles 5 are dispersed.

Further, the electrophoretic display device used in the electrophoretic display apparatus is described but the present invention is also applicable to another particle movement-type display device used for so-called toner display for effecting display by driving only charged particles without using liquid.

Hereinbelow, the present invention will be described more specifically.

EXAMPLE 1

In this example, an electrophoretic display device having a structure shown in FIG. 1 was prepared in the following manner.

On a second substrate 3 formed of glass, TFT9 and wires were formed and thereon a second electrode 7 was disposed pixel by pixel through an insulating layer. The second electrode 7 was formed of aluminum and had a surface provided with a minute unevenness so as to perform reflection and scattering of incident light. Thereafter, a partition wall 4 was disposed through an insulating layer at a boundary of adjacent pixels and then a black third electrode 8 was formed at the surface of the partition wall 4. Thereafter, the third electrode 8 was coated with an insulating layer.

Next, in a space defined by the second substrate 3 and the partition wall 4, a transparent insulating liquid 10 in which charged particles 5 were dispersed was filled and thereon a first substrate 2 having a lattice-like ITO transparent electroconductive layer as a first electrode 6 was disposed. An electrode forming areal ratio on the first substrate 2 was 50%. In this case, an areal ratio of the transparent electrode layer as the first electrode 6 to a pixel area of each pixel was 55%.

Then, in an electrophoretic display apparatus including the thus prepared electrophoretic display device, display was effected by applying predetermined voltages to the first electrode 6, the second electrode 7, and the third electrode 8, respectively, to drive the charged particles 5. As a result, according to this example, by setting the areal ratio of the transparent electrode layer as the first electrode 6 to a pixel area of each pixel to 55%, it is possible to suppress light absorption compared with the case of forming the first electrode 6 on the entire surface of pixel. As a result, it was possible to effect bright display.

EXAMPLE 2

In this example, an electrophoretic display device was prepared in the same manner as in Example 1 except that a lattice-like ITO transparent electrode layer as a first electrode 6 was formed on the surface of the first substrate 2 and was covered with a transparent resin layer 11 having a volume resistivity of about $1.0\times10^{7}$ ohm.cm at the entire electrode surface. An electrode forming areal ratio per a pixel area of pixel was 40%.

Then, in an electrophoretic display apparatus including the thus prepared electrophoretic display device, display was effected by applying predetermined voltages to the first electrode 6, the second electrode 7, and the third electrode 8, respectively, to drive the charged particles 5. As a result, according to this example, by setting the areal ratio of the transparent electrode layer as the first electrode 6 to a pixel area of each pixel to 40%, it is possible to suppress light absorption compared with the case of forming the transparent electrode on the entire surface of pixel. As a result, it was possible to effect bright display.

EXAMPLE 3

In this example, an electrophoretic display device having a structure shown in FIG. 5(*b*) was prepared in the following manner.

On a second substrate 3 formed of glass, TFT9 and wires were formed and thereon a second electrode 7 formed of aluminum was disposed pixel by pixel through an insulating layer.

Next, on the second electrode 7, microcapsules 12 each comprising black charged particles 5*a*, white charged particles 5*b*, and an insulating liquid 10 were dispersed. On the surface thereon a first substrate 2 having an ITO transparent electroconductive layer as a first electrode 6 having a shape as shown in FIG. 4(*a*) was disposed. An electrode forming areal ratio per a pixel area of pixel was 50%.

Then, in an electrophoretic display apparatus including the thus prepared electrophoretic display device, display was effected by applying predetermined voltages to the first electrode 6, and the second electrode 7, respectively, to drive the charged particles 5. As a result, according to this example, by setting the areal ratio of the transparent electrode layer as the first electrode 6 to a pixel area of each pixel to 50%, it is possible to suppress light absorption compared with the case of forming the transparent electrode on the entire surface of pixel. As a result, it was possible to effect bright display.

While the invention has been described with reference to the structures disclosed herein, it is not confined to the details set forth and this application is intended to cover such modifications or changes as may come within the purpose of the improvements or the scope of the following claims.

This application claims priority from Japanese Patent Application No. 354330/2004 filed Dec. 7, 2004, which is hereby incorporated by reference.

What is claimed is:

1. A particle movement display device, comprising:

a pair of front-side first substrate and rear-side second substrate disposed opposite to each other with a spacing therebetween;

a partition wall, disposed between said first and second substrates, for partitioning the spacing into a plurality of sections;

charged particles disposed in each of the sections;

a first electrode disposed on a surface of said first substrate in each section; and a second electrode and a third electrode which are disposed on surfaces, other than the surface of said first substrate, in each section, and between said second electrode and said third electrode, a voltage being applied so as to move said charged particles in each section to display an image, wherein the surface of said first substrate in each section has a first area in which said first electrode is formed and a second area in which said first electrode is not formed, wherein said third electrode is formed on a surface of said partition wall in each section or on a surface of said second substrate contacting said partition wall in each section and has an electric potential common to the plurality of sections.

2. A device according to claim 1, wherein the first area in which said first electrode is formed has an areal ratio of more than 5% and less than 90% per the area of the section.

3. A device according to claim 1, wherein said first electrode is a rectangular lattice electrode or a linear electrode.

4. A device according to claim 1, wherein said first electrode is formed at a peripheral portion in each section and is not formed at a central portion in each section.

5. A device according to claim 1, wherein both the first area and the second area are coated with a resin layer.

6. A device according to claim 1, wherein said first electrode has an electric potential common to the plurality of sections.

7. A particle movement display device, comprising:

a pair of front-side first substrate and rear-side second substrate disposed opposite to each other with a spacing therebetween;

a plurality of capsules, disposed between said first and second substrates, for containing therein charged particles and an insulating liquid;

a first electrode disposed on a surface of said first substrate in each capsule; and a second electrode and a third electrode which are disposed on surfaces, other than the surface of said first substrate, in each capsule, and between said second electrode and said third electrode, a voltage being applied so as to move said charged particles in each capsule to display an image, wherein the surface of said first substrate in each capsule has an area in which said first electrode is formed and an area in which said first electrode is not formed.

8. A particle movement display apparatus, comprising a particle movement type display device according to claim 7.

* * * * *

UNITED STATES PATENT AND TRADEMARK OFFICE

CERTIFICATE OF CORRECTION

PATENT NO. : 7,277,219 B2
APPLICATION NO. : 11/275031
DATED : October 2, 2007
INVENTOR(S) : Tsutomu Ikeda It is certified that error appears in the above-identified patent and that said Letters Patent is hereby corrected as shown below:

COLUMN 4:

Line 1, “back” should read --black--.

COLUMN 6:

Line 11, “electroconductively.” should read --electroconductivity.--.

Signed and Sealed this

Third Day of February, 2009

JOHN DOLL
*Acting Director of the United States Patent and Trademark Office*